US011985426B2

(12) United States Patent
Imai et al.

(10) Patent No.: US 11,985,426 B2
(45) Date of Patent: May 14, 2024

(54) ELECTRONIC APPARATUS CAPABLE OF PERFORMING LINE-OF-SIGHT INPUT, CONTROL METHOD FOR ELECTRONIC APPARATUS, AND STORAGE MEDIUM

(71) Applicant: CANON KABUSHIKI KAISHA, Tokyo (JP)

(72) Inventors: Yuko Imai, Tokyo (JP); Kiyoto Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 17/723,230

(22) Filed: Apr. 18, 2022

(65) Prior Publication Data

US 2022/0353420 A1 Nov. 3, 2022

(30) Foreign Application Priority Data

Apr. 28, 2021 (JP) .................................. 2021-076425

(51) Int. Cl.
*H04N 23/69* (2023.01)
*H04N 23/611* (2023.01)
*H04N 23/63* (2023.01)

(52) U.S. Cl.
CPC ........... *H04N 23/69* (2023.01); *H04N 23/611* (2023.01); *H04N 23/635* (2023.01)

(58) Field of Classification Search
CPC .... H04N 23/69; H04N 23/611; H04N 23/635; H04N 23/62
See application file for complete search history.

(56) References Cited

U.S. PATENT DOCUMENTS 5,214,466 A * 5/1993 Nagano .................. G02B 7/287
396/51

FOREIGN PATENT DOCUMENTS

JP H03-293367 A 12/1991

\* cited by examiner

*Primary Examiner* — Yogesh K Aggarwal
(74) *Attorney, Agent, or Firm* — Canon U.S.A., Inc. IP Division

(57) ABSTRACT

An electronic apparatus is provided that is capable of continuing to capture an object intended as a subject by a user before a zoom operation is started, even in a case where the subject selection based on line-of-sight detection is terminated after the zoom operation has started. The electronic apparatus comprising a line-of-sight detecting unit configured to detect a line-of-sight of a user, a zoom operating member configured to perform a zoom operation, a selecting unit configured to select a subject from an image based on the line-of-sight's position, and a control unit configured to perform control so that when the zoom operation is started by the zoom operating member, subject selection based on the line-of-sight's position is stopped without stopping line-of-sight detection performed by the line-of-sight detecting unit.

16 Claims, 6 Drawing Sheets

ELECTRONIC APPARATUS CAPABLE OF PERFORMING LINE-OF-SIGHT INPUT, CONTROL METHOD FOR ELECTRONIC APPARATUS, AND STORAGE MEDIUM

BACKGROUND

Field

The present disclosure relates to an electronic apparatus capable of performing line-of-sight input, a control method for the electronic apparatus, and a storage medium.

Description of the Related Art

In recent years, electronic apparatuses that allow a user to perform an operation by means of his/her own line of sight (hereinafter, performing the operation by means of line-of-sight is also simply referred to as "line-of-sight input") have become widespread. In an electronic apparatus equipped with a line-of-sight detection device that realizes a line-of-sight input function (for example, a gaming device or an image pickup apparatus such as a digital camera), in particular, in the case that the user wants to immediately issue an operation instruction to the electronic apparatus, the line-of-sight input function is effective as a means for quickly issuing the operation instruction. As a related technique, a technique disclosed in Japanese Laid-Open Patent Publication (kokai) No. H03-293367 has been proposed. In the technique disclosed in Japanese Laid-Open Patent Publication (kokai) No. H03-293367, in a camera having a line-of-sight detection device, when it is judged that a photographing lens is in a zooming operation, line-of-sight detection is terminated, and line-of-sight detection information, which is accumulated before the zooming operation, is reset.

However, in the technique disclosed in Japanese Laid-Open Patent Publication (kokai) No. H03-293367, since the line-of-sight detection is terminated during the zooming operation, detection of the position of a main subject, which is selected by means of the line-of-sight input before the zooming operation, is also automatically terminated. Thus, a problem can arise of a user misses an opportunity to take a photograph according to a main subject desired by the user, during or immediately after the zooming operation.

Further, in an image pickup apparatus equipped with a line-of-sight detection device, since the position of the subject of an image picked up during the zooming operation changes quickly, it is difficult to follow the subject intended by the user's line of sight, and as a result, line-of-sight shaking occurs. Since a line-of-sight position shifts from the intended subject due to the line-of-sight shaking, a problem that it is not possible to continue to capture the subject intended by the user can occur.

SUMMARY

Various embodiments of the present disclosure provide an electronic apparatus capable of continuing to capture an object intended as a subject by a user before a zoom operation is started, even in a case where the subject selection based on line-of-sight detection is terminated after the zoom operation has started, a control method for the electronic apparatus, and a storage medium.

Accordingly, various embodiments of the present disclosure provide an electronic apparatus comprising a line-of-sight detecting unit configured to detect a line-of-sight of a user, a zoom operating member configured to perform a zoom operation, a selecting unit configured to select a subject from an image based on the line-of-sight's position, and a control unit configured to perform control so that when the zoom operation is started by the zoom operating member, subject selection based on the line-of-sight's position is stopped without stopping line-of-sight detection performed by the line-of-sight detecting unit.

According to various embodiments of the present disclosure, it is possible to continue to capture the subject intended by the user before the zoom operation is started, even in the case where the subject selection based on line-of-sight detection is terminated after the zoom operation has started.

Further features of the present disclosure will become apparent from the following description of example embodiments with reference to the attached drawings.

BRIEF DESCRIPTION OF THE DRAWINGS

FIG. 1A is a front perspective view of the image pickup apparatus viewed from the front side, and FIG. 1B is a rear perspective view of the image pickup apparatus viewed from the rear side.

DESCRIPTION OF THE EMBODIMENTS

Various embodiments of the present disclosure will now be described in detail below with reference to the accompanying drawings showing example embodiments thereof.

Hereinafter, various embodiments of the present disclosure will be described in detail with reference to the drawings. However, the configurations described in the following embodiments are merely examples, and it should be understood that the scope of the present invention is not limited by the configurations described in the below example embodiments.

Figure 1A:
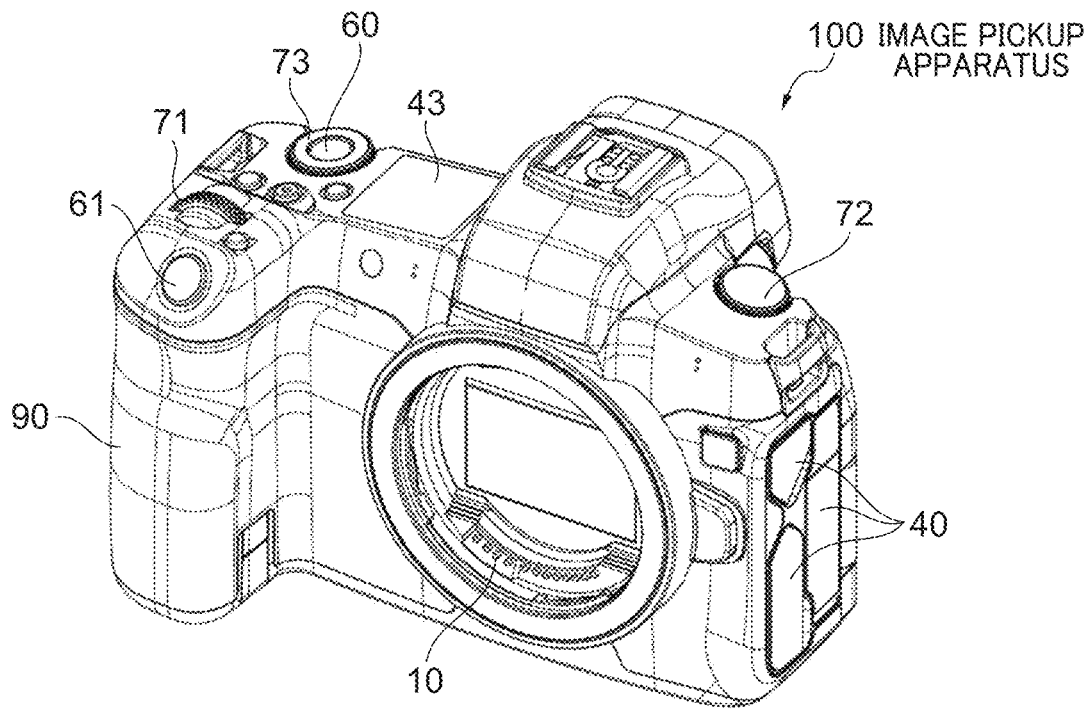
FIG. 1A and FIG. 1B are views that show an appearance configuration example of an image pickup apparatus according to a first embodiment of the present disclosure.
Figure 1B:
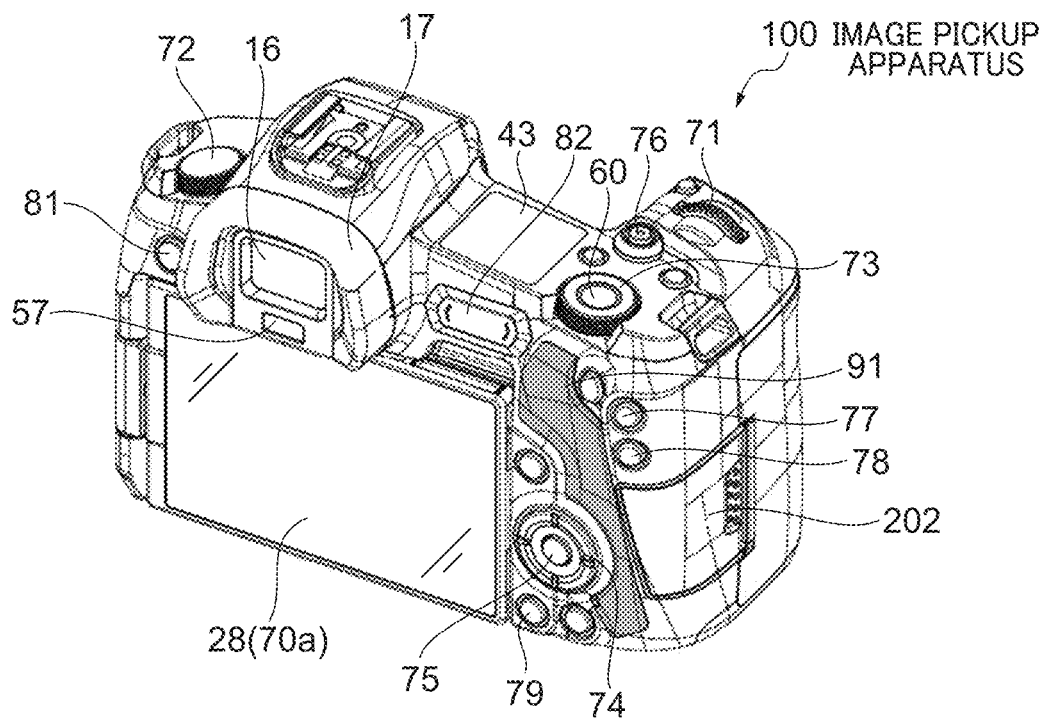

At first, a first embodiment of the present disclosure will be described with reference to the drawings. According to the first embodiment of the present invention, an image pickup apparatus 100 is presented as an example of an electronic apparatus, to which the present invention can be applied. FIG. 1A and FIG. 1B are views that show an appearance configuration example of the image pickup apparatus 100 according to the first embodiment of the present disclosure. FIG. 1A is a front perspective view of the image pickup apparatus 100 viewed from the front side, and FIG. 1B is a rear perspective view of the image pickup apparatus 100 viewed from the rear side.

As shown in FIG. 1A and FIG. 1B, the image pickup apparatus 100 according to the first embodiment of the present disclosure is an interchangeable lens type image pickup apparatus 100, and is, for example, an interchangeable lens type digital camera such as a digital mirrorless single-lens camera or a digital single-lens reflex camera. The image pickup apparatus 100 according to the first embodiment of the present disclosure is equipped with a line-of-sight input function.

A display unit 28 is provided on a back surface of the image pickup apparatus 100, and the display unit 28 is a display device for displaying image data and various kinds of information. Further, a touch panel 70a can detect a touch operation on a display surface (a touch operation surface) of the display unit 28. An extra-finder display unit 43 is a display unit provided on an upper surface of the image pickup apparatus 100, and displays various setting values of the image pickup apparatus 100 such as a shutter speed and an aperture. A shutter button 61 is an operating member for issuing a photographing instruction. A mode change-over switch 60 is an operating member for switching among various kinds of modes. A terminal cover 40 is a cover for protecting a connector (not shown) that connects a connection cable connected to an external apparatus and the image pickup apparatus 100. A main electronic dial 71 is a rotation operating member, and it is possible to change the setting values such as the shutter speed and the aperture by a user rotating the main electronic dial 71. A power switch 72 is an operating member that switches between a power ON state and a power OFF state of the image pickup apparatus 100. A sub electronic dial 73 is a rotation operating member, and it is possible to perform operations such as moving a selection frame (a cursor) and forwarding an image by the user rotating the sub electronic dial 73. A four-direction key 74 is configured so that each of an upper part, a lower part, a left part, and a right part can be pushed in, and it is possible to perform a processing corresponding to the pressed part of the four-direction key 74. A SET button 75 is a push button and is mainly used for determining a selected item, and the like.

A moving image button 76 is used for instructing the start and stop of moving image photographing (moving image recording). An AE (Automatic Exposure) lock button 77 is a push button, and it is possible to fix an exposure state by pressing the AE lock button 77 in a photographing standby state. An enlargement button 78 is an operation button for switching between an ON state and an OFF state of an enlargement mode in a live view display (hereinafter, also simply referred to as "an LV display") of a photographing mode. By operating the main electronic dial 71 after turning on the enlargement mode (i.e., switching to the ON state of the enlargement mode) by the enlargement button 78, it is possible to perform enlarging or reducing a live view image (an LV image). Further, in a reproduction mode, the enlargement button 78 also functions as an operation button for enlarging an image displayed on the display unit 28 (that is, a reproduced image) and increasing an enlargement ratio of the reproduced image.

A reproduction button 79 is an operation button for switching between the photographing mode and the reproduction mode. By pressing the reproduction button 79 during the photographing mode, it is possible to shift from the photographing mode to the reproduction mode, and display the latest image data among image data recorded (stored) on a recording medium 200 described later on the display unit 28. A menu button 81 is a push button used for performing an instruction operation to display a menu screen, and when the menu button 81 is pressed, the menu screen, on which various kinds of settings can be performed, is displayed on the display unit 28. The user can intuitively perform the various kinds of settings by using the menu screen displayed on the display unit 28, and the four-direction key 74 and the SET button 75.

Figure 2:
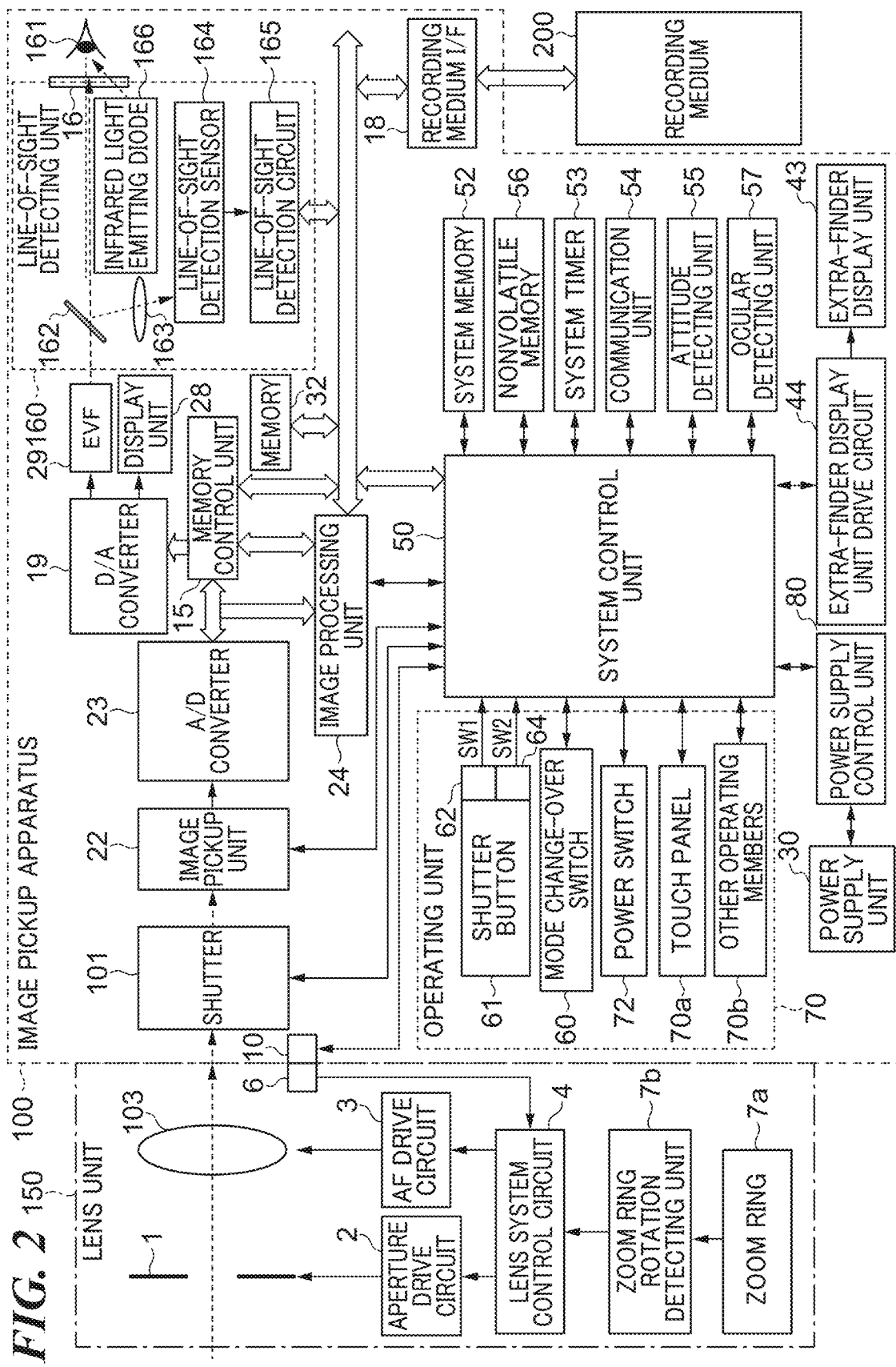
FIG. 2 is a block diagram that shows a configuration example of the entire image pickup apparatus in the case that an interchangeable lens type lens unit is attached to the image pickup apparatus shown in FIG. 1A and FIG. 1B.

A communication terminal 10 is a communication terminal for the image pickup apparatus 100 to communicate with a lens unit 150 that will be described later and can be attached/detached to/from the image pickup apparatus 100. An eyepiece portion (i.e., an ocular portion) 16 is an eyepiece portion of an eyepiece finder 17 (a looking-into-type finder). The user can visually recognize the image displayed on an internal electronic view finder 29 (hereinafter, simply referred to as "an EVF 29") through the eyepiece portion 16. Further, the EVF 29 as a display device is not shown in FIG. 1A and FIG. 1B, but is shown in FIG. 2. An eyepiece detecting unit (i.e., an ocular detecting unit) 57 is an eyepiece detection sensor that detects whether or not the user (a photographer) brings his/her eye in contact with the eyepiece portion 16. A lid 202 is a lid of a slot for housing the recording medium 200. A grip portion 90 is a holding portion formed in a shape that is easily gripped by the right hand when the user holds the image pickup apparatus 100. The shutter button 61 and the main electronic dial 71 are disposed at positions that can be operated by the index finger of the right hand while the user holds the image pickup apparatus 100 by holding the grip portion 90 with the little finger, the ring finger, and the middle finger of the right hand. Further, the sub electronic dial 73 and a touch bar 82 are disposed at positions that can be operated by the thumb of the right hand while the user holds the image pickup apparatus 100 by holding the grip portion 90 with the little finger, the ring finger, and the middle finger of the right hand. A thumb rest portion 91 (a thumb standby position) is a grip member that is provided on the back surface side of the image pickup apparatus 100 at a position where the thumb of the right hand holding the grip portion 90 can be easily placed without operating any operating member. The thumb rest portion 91 is configured by a rubber member or the like for enhancing a holding force (a grip feeling).

Next, with reference to FIG. 2, the configuration of the entire image pickup apparatus in the case that the interchangeable lens type lens unit 150 is attached to the image pickup apparatus 100 according to the first embodiment of the present disclosure shown in FIG. 1A and FIG. 1B will be described. FIG. 2 is a block diagram that shows a configuration example of the entire image pickup apparatus in the case that the lens unit 150 is attached to the image pickup apparatus 100 shown in FIG. 1A and FIG. 1B.

As shown in FIG. 2, the lens unit 150 is a lens unit that is equipped with an interchangeable photographing lens. Although a lens 103 is usually configured by a plurality of lenses, FIG. 2 shows only one lens for simplification. A communication terminal 6 is a communication terminal for the lens unit 150 to communicate with the image pickup apparatus 100 side, and the communication terminal 10 is the communication terminal for the image pickup apparatus 100 to communicate with the lens unit 150 side. The lens unit 150 communicates with a system control unit 50 of the image pickup apparatus 100 via the communication terminal 6 and the communication terminal 10. Further, the lens unit 150 performs the control of an aperture 1 by means of an internal lens system control circuit 4 and via an aperture drive circuit 2. Further, the lens unit 150 brings into focus by displacing the position of the lens 103 by means of the lens system control circuit 4 and via an AF drive circuit 3. A zoom ring 7a is an operating member for performing a zoom operation by the user, and functions as a zoom operating member. When the zoom operation by the user is started, the lens unit 150 detects that there is a rotation of the zoom ring 7a (i.e., the zoom ring 7a is rotated), and the amount of the rotation of the zoom ring 7a, by a zoom ring rotation detecting unit 7b capable of detecting the rotation of the zoom ring 7a, controls the lens 103 via the lens system control circuit 4, and performs a zooming operation. Further, when the zoom operation by the user is ended, the lens unit 150 detects that there is no rotation of the zoom ring 7a (i.e., the zoom ring 7a does not rotate) by the zoom ring rotation detecting unit 7b, controls the lens 103 via the lens system control circuit 4, and ends the zooming operation.

Moreover, the zoom operating member is not limited to the zoom ring 7a, but may be the touch panel 70a. For example, such a configuration may be adopted, that is, when the user performs a pinch-in or pinch-out touch operation on the touch panel 70a, according to a change in a distance between these touch positions, the lens unit 150 controls the lens 103 via the lens system control circuit 4, and performs the zooming operation.

A shutter 101 is a focal plane shutter that can freely control an exposure time of an image pickup unit 22 under the control of the system control unit 50.

The image pickup unit 22 is an image pickup element (an image sensor) configured by a CCD (Charge Coupled Device) element, a CMOS (Complementary Metal Oxide Semiconductor) element, or the like that converts an optical image into electrical signals. Further, the image pickup unit 22 may have an image sensing plane phase difference sensor that outputs defocus amount information to the system control unit 50. An A/D (analog-to-digital) converter 23 converts analog signals, which are outputted from the image pickup unit 22, into digital signals.

An image processing unit 24 performs predetermined processing (for example, a pixel interpolation processing, a resizing processing such as reduction, a color conversion processing, etc.) with respect to data from the A/D converter 23 or data from a memory control unit 15. Further, the image processing unit 24 performs a predetermined calculation processing by using image data picked up, and the system control unit 50 performs an exposure control and a distance measurement control based on the calculation result obtained by the image processing unit 24. As a result, a TTL (through-the-lens) method AF (auto focus) processing, an AE (auto exposure) processing, an EF (flash pre-flash) processing, etc. are performed. Furthermore, the image processing unit 24 performs a predetermined calculation processing by using the image data picked up, and performs a TTL method AWB (auto white balance) processing based on the obtained calculation result.

Output data from the A/D converter 23 is written into a memory 32 via the image processing unit 24 and the memory control unit 15. Alternatively, the output data from the A/D converter 23 is written into the memory 32 via the memory control unit 15 without going through the image processing unit 24. The memory 32 stores image data that is obtained by the image pickup unit 22 and is converted into digital data by the A/D converter 23, and image data to be displayed on the display unit 28 and the EVF 29. The memory 32 has a storage capacity sufficient to store data of a predetermined number of still images, data of moving images for a predetermined time, and audio data.

Further, the memory 32 also serves as a memory (a video memory) for image display. A D/A (digital-to-analog) converter 19 converts data for image display, which is stored in the memory 32, into analog signals and then supplies it to the display unit 28 and the EVF 29. In this way, the image data for display, which is written into the memory 32, is displayed on the display unit 28 and the EVF 29 via the D/A converter 19. The display unit 28 and the EVF 29 are display devices such as an LCD (Liquid Crystal Display) and an organic EL (Electro-Luminescence) display, respectively, and perform a display corresponding to the analog signals from the D/A converter 19. It is possible to perform the live view display (the LV display) by converting the digital signals, which are obtained by an A/D conversion performed by the A/D converter 23 and are stored in the memory 32, into the analog signals by the D/A converter 19, and sequentially transferring the analog signals to the display unit 28 or the EVF 29 for display. Hereinafter, the image displayed in the live view display on the display unit 28 or the EVF 29 is referred to as the live view image (the LV image).

The system control unit 50 is a control unit that is configured by at least one processor and/or at least one circuit, and controls the entire image pickup apparatus 100. The system control unit 50 is a processor and is also a circuit. The system control unit 50 realizes various kinds of processing for each example embodiment of the present disclosure described below, by executing programs stored in a nonvolatile memory 56. Further, the system control unit 50 also performs a display control by controlling the memory 32, the D/A converter 19, the display unit 28, the EVF 29, etc.

For example, a system memory 52 is a RAM (Random Access Memory). The system control unit 50 expands constants and variables for the operation of the system control unit 50, the program that is read out from the nonvolatile memory 56, etc. on the system memory 52.

The nonvolatile memory 56 is a memory that can be electrically erased and recorded, and is, for example, an EEPROM (Electrically Erasable Programmable Read Only Memory) or the like. The constants, programs, etc. for the operation of the system control unit 50 are stored in the nonvolatile memory 56. The programs referred to here are programs for executing various kinds of flowcharts, which will be described later in each example embodiment of the present disclosure.

A system timer 53 is a time measuring unit (a clocking unit) that measures the time used for various controls and the time of a built-in clock.

A communication unit 54 transmits and receives video signals and audio signals to and from the external apparatus that is connected by a wireless or wired cable. The communication unit 54 can also be connected to a wireless LAN (Local Area Network) or the Internet. In addition, the communication unit 54 can also communicate with the external apparatus by using Bluetooth (registered trademark) or Bluetooth Low Energy. The communication unit 54 can transmit the image data (also including the LV image data) picked up by the image pickup unit 22 functioning as an image pickup means and the image recorded on the recording medium 200 to the external apparatus, and also, the communication unit 254 can receive the image data and other various kinds of information from the external apparatus.

An attitude detecting unit 55 detects an attitude of the image pickup apparatus 100 with respect to the direction of gravity. Based on the attitude detected by the attitude detecting unit 55, it is possible to judge whether the image photographed by the image pickup unit 22 is an image photographed by holding the image pickup apparatus 100 horizontally or an image photographed by holding the image pickup apparatus 100 vertically. The system control unit 50 can add orientation information corresponding to the attitude detected by the attitude detecting unit 55 to an image file of the image picked up by the image pickup unit 22, and further, the system control unit 50 can rotate the image picked up according to the detected orientation and record it. As the attitude detecting unit 55, an acceleration sensor, a gyro sensor, or the like can be used. By using the acceleration sensor or the gyro sensor that is the attitude detecting unit 55, it is also possible to detect the movement of the image pickup apparatus 100 (pan, tilt, lift, whether or not it is stationary, etc.).

The eyepiece detecting unit 57 is the eyepiece detection sensor that detects approaching (eye-contacting) and separating (eye-separation) of an eye (an object) with respect to the eyepiece portion 16 of the eyepiece finder 17 (hereinafter, also simply referred to as "a finder"). The system control unit 50 switches display (a display state)/non-display (a non-display state) of the display unit 28 and the EVF 29 according to the state detected by the eyepiece detecting unit 57. More specifically, at least in the case that it is in the photographing standby state and switching setting of a display destination is an automatic switching, during non-eye-contacting, the display destination is set to the display unit 28, the display of the display unit 28 is turned on (i.e., the display unit 28 becomes in the display state), and the EVF 29 is hidden (i.e., the EVF 29 becomes in the non-display state). Further, during eye-contacting, the display destination is set to the EVF 29, the display of the EVF 29 is turned on (i.e., the EVF 29 becomes in the display state), and the display unit 128 is hidden (i.e., the display unit 128 becomes in the non-display state). As the eyepiece detecting unit 57, for example, an infrared proximity sensor can be used, and it is possible to detect the approach of some object to the eyepiece portion 16 of the finder 17 having the EVF 29 built-in. When an object approaches the eyepiece portion 116, infrared rays projected from a light projecting unit (not shown) of the eyepiece detecting unit 57 are reflected by the object, and are received by a light receiving unit (not shown) of the infrared proximity sensor. It is also possible to judge how close the object is from the eyepiece portion 16 (an eyepiece distance) based on the amount of the infrared rays received. In this way, the eyepiece detecting unit 57 performs eyepiece detection that detects a proximity distance of the object to the eyepiece portion 16. When an object approaching the eyepiece portion 16 within a predetermined distance is detected from a non-eye-contacting state (a non-approaching state), it is determined that the eye-contacting is detected. On the other hand, when the object that has detected the approach is separated by the predetermined distance or more from an eye-contacting state (an approaching state), it is determined that the eye-separation is detected. A threshold value for detecting the eye-contacting and a threshold value for detecting the eye-separation may be different values by providing, for example, a hysteresis. Further, after detecting the eye-contacting, it is determined that it is in the eye-contacting state until the eye-separation is detected. Furthermore, after detecting the eye-separation, it is determined that it is in the non-eye-contacting state until the eye-contacting is detected. Moreover, the infrared proximity sensor is an example of the eyepiece detection sensor (the eyepiece detecting unit 57), and other sensors may be adopted as the eyepiece detection sensor (the eyepiece detecting unit 57) as long as they can detect a state that can be regarded as the eye-contacting and a state that can be regarded as the eye-separation.

The various setting values of the image pickup apparatus 100 such as the shutter speed and the aperture, are displayed on the extra-finder display unit 43 via an extra-finder display unit drive circuit 44.

A power supply control unit 80 is configured by a battery detecting circuit (not shown), a DC-DC converter (not shown), a switch circuit (not shown) for switching between blocks to be energized, etc., and detects whether or not a battery is installed, the type of the battery, the remaining battery level, etc. Further, the power supply control unit 80 controls the DC-DC converter based on its own detection result and an instruction from the system control unit 50, and supplies a necessary voltage to each unit including the recording medium 200 for a necessary period. A power supply unit 30 is configured by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 such as a memory card or a hard disk. The recording medium 200 is a recording medium such as the memory card for recording the photographed image (the image data), and is configured by a semiconductor memory, a magnetic disk, or the like.

An operating unit 70 is an input unit that accepts operations by the user (hereinafter, also simply referred to as "user operations"), and is used to input various kinds of operation instructions into the system control unit 50. As shown in FIG. 2, the operating unit 70 includes the shutter button 61, the mode change-over switch 60, the power switch 72, the touch panel 70a, other operating members 70b, etc. Further, the other operating members 70b include the main electronic dial 71, the sub electronic dial 73, the four-direction key 74, the SET button 75, the moving image button 76, the AE lock button 77, the enlargement button 78, the reproduction button 79, the menu button 81, the touch bar 82, etc.

The shutter button 61 has a first shutter switch 62 and a second shutter switch 64. The first shutter switch 62 is turned on in the middle of operating the shutter button 61 by a so-called half-pressing (i.e., by a photographing preparation instruction) to generate a first shutter switch signal SW1. Upon receiving the first shutter switch signal SW1, the system control unit 50 starts photographing preparation operations such as the AF (auto focus) processing, the AE (auto exposure) processing, the AWB (auto white balance) processing, the EF (flash pre-flash) processing, etc.

The second shutter switch 64 is turned on when the operation of the shutter button 61 is completed by a so-called full-pressing (i.e., by a photographing instruction) to generate a second shutter switch signal SW2. Upon receiving the second shutter switch signal SW2, the system control unit 50 starts operations of a series of photographing processing from reading out signals from the image pickup unit 22 to writing the image picked up as the image file into the recording medium 200.

The mode change-over switch 60 switches the operation mode of the system control unit 50 to any one of a still image photographing mode, a moving image photographing mode, the reproduction mode, etc. As modes included in the still image photographing mode, there are an auto photographing mode, an auto scene discrimination mode, a manual mode, an aperture priority mode (an Av mode), a shutter speed priority mode (a Tv mode), and a program AE mode (a P mode). In addition, the still image photographing mode includes various scene modes, various custom modes, etc., which become photographing settings for each photographing scene. The user can directly switch to any one of these modes by using the mode change-over switch 60. Alternatively, the user may use the mode change-over switch 60 to temporarily switch to a photographing mode list screen, and then selectively switch to any one of a plurality of modes, which are displayed on the photographing mode list screen, by using another operating member. Similarly, the moving image photographing mode may include a plurality of modes.

The touch panel 70a is a touch sensor that detects various kinds of touch operations on the display surface (an operation surface of the touch panel 70a) of the display unit 28. The touch panel 70a and the display unit 28 can be integrally configured. For example, the touch panel 70a is configured so that light transmittance of a light does not interfere with the display of the display unit 28, and is attached to an upper layer of the display surface of the display unit 28. Further, input coordinates on the touch panel 70a are associated with display coordinates on the display surface of the display unit 28. As a result, it becomes possible to provide a GUI (a graphical user interface) as if the user can directly operate a screen displayed on the display unit 28.

A line-of-sight detecting unit 160 is an eye tracking unit for detecting the user's line of sight as to whether or not the user who has brought his/her eye in contact with the eyepiece portion 16 is looking at the EVF 29 and if so, what position the user is looking at. That is, the line-of-sight detecting unit 160 functions as an accepting means (a line-of-sight input means) that detects the direction and the position of the user's line of sight, and accepts the line-of-sight input based on the detection result. Further, the line-of-sight detecting unit 160 includes a dichroic mirror 162, an image forming lens 163, a line-of-sight detection sensor 164, an infrared light emitting diode 166, and a line-of-sight detection circuit 165.

The infrared light emitting diode 166 is a light emitting element, and irradiates an eyeball (an eye) 161 of the user who has brought his/her eye in contact with the eyepiece portion 16 with infrared light. The infrared light emitted from the infrared light emitting diode 166 is reflected by the eyeball (the eye) 161, and reflected light of the infrared light (hereinafter, simply referred to as "infrared reflected light") reaches the dichroic mirror 162. The dichroic mirror 162 reflects only the infrared light and transmits visible light. The infrared reflected light whose optical path is changed is image-formed on an image sensing plane of the line-of-sight detection sensor 164 via the image forming lens 163. The image forming lens 163 is an optical member that constitutes a line-of-sight detection optical system. The line-of-sight detection sensor 164 includes an image pickup element such as a CCD type image sensor. The line-of-sight detection sensor 164 photoelectrically converts the incident infrared reflected light into electrical signals and outputs them to the line-of-sight detection circuit 165. The line-of-sight detection circuit 165 has at least one processor. Further, the line-of-sight detection circuit 165 detects a line-of-sight position of the user from an image or the movement of the eyeball (the eye) 161 of the user and based on the output signal of the line-of-sight detection sensor 164, and outputs detection information to the system control unit 50.

In the first embodiment, by using the line-of-sight detecting unit 160 and utilizing a line-of-sight detection method called a corneal reflection method, the user's line of sight is detected. The corneal reflection method is a line-of-sight detection method that detects the direction and the position of the line-of-sight on the basis of a positional relationship between the reflected light of the infrared light emitted from the infrared light emitting diode 166 reflected by the eyeball (the eye) 161, especially by the cornea, and the pupil of the eyeball (the eye) 161. However, the line-of-sight detection method that can be used in various embodiments of the present disclosure is not limited to the above-mentioned corneal reflection method, and any line-of-sight detection method other than the corneal reflection method may be used as long as it can detect the direction and the position of the line-of-sight. For example, a line-of-sight detection method called a scleral reflection method, which utilizes a fact that the light reflectance of the white part of the eye is different from the light reflectance of the black part of the eye, may be used.

Further, as described above, in the first embodiment, the light projecting unit and the light receiving unit of the eyepiece detecting unit 57 are devices separate from the infrared light emitting diode 166 and the line-of-sight detection sensor 164. However, the present invention is not limited to this, the infrared light emitting diode 166 may also serve as the light projecting unit of the eyepiece detecting unit 57, and the line-of-sight detection sensor 164 may also serve as the light receiving unit of the eyepiece detecting unit 57.

The system control unit 50 can detect the following operations and states based on the output from the line-of-sight detecting unit 160 (that is, the detection information received from the line-of-sight detection circuit 165).

(1) newly inputting (detecting) the line-of-sight of the user who has brought his/her eye in contact with the eyepiece portion 16, that is, an operation to start line-of-sight input (2) a state of having the line-of-sight input of the user who has brought his/her eye in contact with the eyepiece portion 16

(3) a state, in which the user who has brought his/her eye in contact with the eyepiece portion 16 is watching (gazing)

(4) taking off the line-of-sight inputted by the user who has brought his/her eye in contact with the eyepiece portion 16, that is, an operation to end the line-of-sight input (5) a state, in which the user who has brought his/her eye in contact with the eyepiece portion 16 does not perform the line-of-sight input (does not input any line-of-sight)

The watching (gazing) mentioned here means that the user has been looking at almost the same position for a certain period of time. As a gaze judging method for judging whether or not the user is watching (gazing), for example, in the case that the line-of-sight position of the user does not exceed a predetermined movement amount for a first predetermined time (for example, about 0.5 seconds), the system control unit 50 judges that the user is watching (gazing). Moreover, the first predetermined time may be a time that can be set by the user, may be a predetermined fixed time, or may be changed depending on a distance relationship between the immediately preceding line-of-sight position and the current line-of-sight position. For example, based on the detection information received from the line-of-sight detection circuit 165, the system control unit 50 judges that the user is watching when the duration of a state, in which the user's line of sight is detected at almost the same position (hereinafter referred to as "a no-line-of-sight-moving state"), exceeds a predetermined threshold period. Further, for example, in the case that the average position of the detected position of the line-of-sight in a short period (≤the predetermined threshold period) including the latest line-of-sight detection timing is within a predetermined range and the variation (the variance) is less than a predetermined value, the system control unit 50 judges that it is in the no-line-of-sight-moving state.

As described above, in the image pickup apparatus 100 according to the first embodiment of the present disclosure, the line-of-sight input function is realized by the combination of the EVF 29 and the line-of-sight detecting unit 160.

Next, a control processing performed by the image pickup apparatus according to the first embodiment will be described. In the first embodiment, as the control unit, the system control unit 50 in the image pickup apparatus 100 performs the control processing that switches from subject selection based on the user's line of sight to subject detection based on a predetermined algorithm of the image pickup apparatus 100 in response to the start of the zoom operation. When the power of the image pickup apparatus 100 is turned on by the power switch 72, each process in the control processing also including a line-of-sight return trigger processing described later is realized by the system control unit 50 expanding the program stored in the nonvolatile memory 56 on the system memory 52 and executing it.

Figure 3:
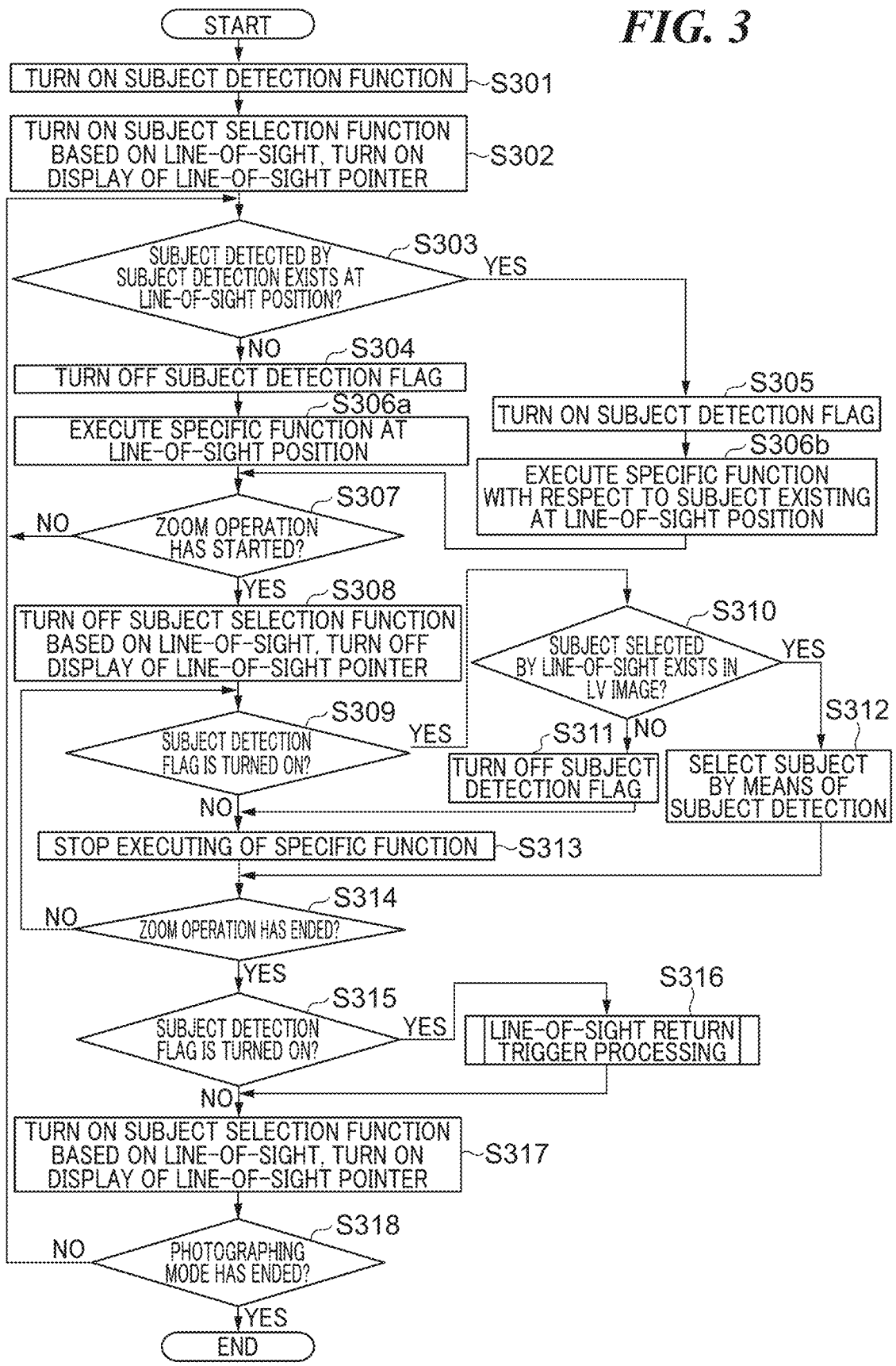
FIG. 3 is a flowchart that shows the flow of a control processing performed by the image pickup apparatus according to the first embodiment.

FIG. 3 is a flowchart that shows the flow of the control processing performed by the image pickup apparatus 100 according to the first embodiment. Hereinafter, the subject selection based on the user's line of sight is referred to as "subject selection based on line-of-sight" or simply "subject selection". Further, the subject detection based on the predetermined algorithm of the image pickup apparatus 100 is simply referred to as "subject detection". Furthermore, the predetermined algorithm mentioned in the present disclosure refers to an algorithm capable of detecting a subject. For example, the predetermined algorithm may be an algorithm that utilizes deep learning. The image pickup apparatus 100 is equipped with a subject selection function based on line-of-sight and a subject detection function. The subject selection function based on line-of-sight is a function that selects a subject existing at a line-of-sight position indicated by a line-of-sight pointer, which will be described later. Further, the subject detection function is a function that detects a subject by means of the predetermined algorithm, and the subject detected by the subject detection function is displayed in an AF (auto focus) frame. Moreover, in the following description, S means a step.

First, in S301, the system control unit 50, which functions as a subject detection unit, starts a subject detection processing, which detects a subject by means of the predetermined algorithm of the image pickup apparatus 100, by turning on the subject detection function.

Next, in S302, the system control unit 50, which functions as a selecting unit that selects a subject based on the position of the line-of-sight (the line-of-sight's position), turns on the subject selection function based on line-of-sight, and starts the subject selection based on line-of-sight. Further, the system control unit 50 causes the EVF 29 to display the line-of-sight pointer in a first predetermined color by turning on the display of the line-of-sight pointer on the EVF 29. The line-of-sight pointer referred to here is a mark that indicates a user's line-of-sight position (hereinafter, also simply referred to as "a line-of-sight position") detected by the line-of-sight detecting unit 160, that is, the line-of-sight pointer indicates a line-of-sight position based on the line-of-sight input accepted by the line-of-sight detecting unit 160, which functions as the line-of-sight input means. In other words, in S302, when the subject selection function based on line-of-sight is turned on, the line-of-sight pointer, which indicates the line-of-sight position detected by the line-of-sight detecting unit 160, is displayed on the EVF 29 in the first predetermined color. For example, the first predetermined color may be red.

Next, in S303, the system control unit 50 judges whether or not a subject detected by the subject detection exists at the line-of-sight position indicated by the line-of-sight pointer displayed in the first predetermined color (that is, the line-of-sight position intended by the user). In S303, in the case of judging that the subject detected by the subject detection exists at the line-of-sight position intended by the user, the system control unit 50 advances the processing to S305. On the other hand, in S303, in the case of judging that the subject detected by the subject detection does not exist at the line-of-sight position intended by the user, the system control unit 50 advances the processing to S304.

In S304, the system control unit 50 sets a subject detection flag to OFF (i.e., turns off the subject detection flag), and then advances the processing to S306*a*. The subject detection flag is a flag that indicates whether or not the subject detected by the subject detection exists at the line-of-sight position intended by the user. In S306*a*, the system control unit 50 executes a specific function at the line-of-sight position intended by the user, and advances the processing to S307. The specific function referred to here is, for example, an AF function, an AE function, an AWB function, and a subject tracking function. Since it is judged as NO in S303, the subject detected by the subject detection does not exist at the line-of-sight position intended by the user. Therefore, the specific function is executed at a position where it is judged that there is a gaze of the detected user's line of sight (i.e., at the line-of-sight position intended by the user). Since there is no subject at the line-of-sight position intended by the user, the specific function is executed with respect to some regions on a live view image where the subject is not recognized, such as a background or an object. At this time, the region for executing the specific function may be a preset region, or may be a region where it is judged that a distance between the position specified by the line-of-sight position and the image pickup unit 22 is the same distance. In the case that the region is determined by the distance, it is convenient to use, for example, in a situation that even though there is a subject, the subject is not determined to be the subject, or when photographing scenery, etc.

On the other hand, in S305, the system control unit 50 sets the subject detection flag to ON (i.e., turns on the subject detection flag), and then advances the processing to S306*b*. In S306*b*, the system control unit 50 executes the specific function with respect to the subject at the detected line-of-sight position (the subject existing at the line-of-sight position intended by the user), that is, executes the specific function with respect to the subject existing at the line-of-sight position, and then advances the processing to S307.

In S307, the system control unit 50 judges whether or not the user has started the zoom operation by means of the operating unit 70 or the zoom ring 7*a*, and in the case of judging that the zoom operation has started, the system control unit 50 advances the processing to S308. On the other hand, in S307, in the case of judging that the zoom operation has not started, the system control unit 50 returns the processing to S303.

In S308, the system control unit 50 ends the subject selection based on line-of-sight by turning off the subject selection function based on line-of-sight. Further, the system control unit 50 turns off the display of the line-of-sight pointer displayed on the EVF 29. That is, the display of the line-of-sight pointer on the EVF 29 in the first predetermined color is also turned off. Here, such a configuration may be adopted, that is, not only the subject selection based on line-of-sight is ended, but also a line-of-sight detection processing performed by the line-of-sight detecting unit 160 is interrupted.

Next, in S309, the system control unit 50 judges whether or not the subject detection flag is turned on, and in the case of judging that the subject detection flag is turned on, the system control unit 50 advances the processing to S310. On the other hand, in S309, in the case of judging that the subject detection flag is not turned on, the system control unit 50 advances the processing to S313.

In S310, the system control unit 50 judges whether or not a subject selected by the user's line of sight before the zoom operation (hereinafter, simply referred to as "a subject selected by line-of-sight") exists in the live view image. In S310, in the case of judging that the subject selected by line-of-sight exists in the live view image, the system control unit 50 advances the processing to S312, and on the other hand, in the case of judging that the subject selected by line-of-sight does not exist in the live view image, the system control unit 50 advances the processing to S311.

In S311, the system control unit 50 sets the subject detection flag to OFF (i.e., turns off the subject detection flag), and then advances the processing to S313.

In S312, the system control unit 50 selects the subject by means of the subject detection, that is, selects the subject detected by the subject detection (the subject selected by line-of-sight, which exists in the live view image), and then advances the processing to S314. The subject detection is performed, for example, by a pattern matching processing with the image of the subject selected by line-of-sight. As a result, the subject selected by line-of-sight is continuously detected from the image even while the subject selection based on line-of-sight is interrupted, and becomes an execution target of the specific function.

In S313, the system control unit 50 stops executing of the specific function whose execution is started in S306a or S306b, and advances the processing to S314.

In S314, the system control unit 50 judges whether or not the zoom operation by the user has ended, and in the case of judging that the zoom operation by the user has ended, the system control unit 50 advances the processing to S315. On the other hand, in S314, in the case of judging that the zoom operation by the user has not ended, the system control unit 50 returns the processing to S309.

In S315, the system control unit 50 judges whether or not the subject detection flag is turned on, and in the case of judging that the subject detection flag is turned on, the system control unit 50 advances the processing to S316. On the other hand, in S315, in the case of judging that the subject detection flag is not turned on, the system control unit 50 advances the processing to S317.

In S316, the system control unit 50 performs the line-of-sight return trigger processing, and in the case of judging that a line-of-sight return trigger condition is satisfied, the system control unit 50 ends the line-of-sight return trigger processing, in order to return to the subject selection function based on line-of-sight, the system control unit 50 advances the processing to S317. The details of the line-of-sight return trigger processing will be described later.

In S317, the system control unit 50 starts the subject selection based on line-of-sight by turning on the subject selection function based on line-of-sight, and causes the EVF 29 to display the line-of-sight pointer in the first predetermined color by turning on the display of the line-of-sight pointer on the EVF 29.

Next, in S318, the system control unit 50 judges whether or not the photographing mode has ended, and in the case of judging that the photographing mode has not ended, the system control unit 50 returns the processing to S303. On the other hand, in S318, in the case of judging that the photographing mode has ended, the system control unit 50 ends the processing.

As described above, in the control processing performed by the image pickup apparatus 100 according to the first embodiment, it is possible to perform the following controls (a control A, a control B, a control C, and a control D). In the present disclosure, in some instances, "before the zoom operation is started" is referred to as "before the zoom operation", "during a time period that the zoom operation is being performed" is referred to as "during the zoom operation", and "after the zoom operation is ended" is referred to as "after the zoom operation".

(The control A) In the case that the subject is detected by the subject detection at the line-of-sight position before the zoom operation starts and the subject is detected by the subject detection during the zoom operation: After the zoom operation ends, when the line-of-sight return trigger condition is satisfied, return to the subject selection function based on line-of-sight.

(The control B) In the case that the subject is not detected by the subject detection at the line-of-sight position before the zoom operation starts and the specific function is executed at the line-of-sight position: During the zoom operation, stop the executing of the specific function whose execution is started, and when the zoom operation is ended, return to the subject selection function based on line-of-sight.

(The control C) Regardless of whether or not there is a subject detected by the subject detection at the line-of-sight position before the zoom operation starts: During the zoom operation, turn off the subject selection function based on line-of-sight.

(The control D) In the case that the subject is detected by the subject detection at the line-of-sight position before the zoom operation starts but the subject cannot be detected by the subject detection during the zoom operation: During the zoom operation, stop the executing of the specific function whose execution is started, and when the zoom operation ends, return to the subject selection function based on line-of-sight.

Moreover, in the present disclosure, the specific function is not limited to the AF function, the AE function, the AWB function, and the subject tracking function that are described above, and may be a function other than the AF function, the AE function, the AWB function, and the subject tracking function. In other embodiments, the specific function may be another function, as long as it is a function that uses the subject selection.

As described above, in various embodiments of the present disclosure, when the zoom operation is started during a period of the subject selection based on line-of-sight, the subject selection method is switched from the subject selection based on line-of-sight to the subject detection. Then, after the zoom operation is completed, when the line-of-sight return trigger condition is satisfied, there is a return to the subject selection function based on line-of-sight. Therefore, even during the zoom operation, it is possible to continue to capture the subject intended by the user before the zoom operation started. As described above, in various embodiments of the present disclosure, since the subject selection function based on line-of-sight is turned off during the zoom operation, it is possible to avoid an erroneous input due to the line-of-sight shaking (for example, the selection of an erroneous subject), and as a result, the chances of missing a photographing opportunity after the zoom operation ends can be reduced.

Figure 4:
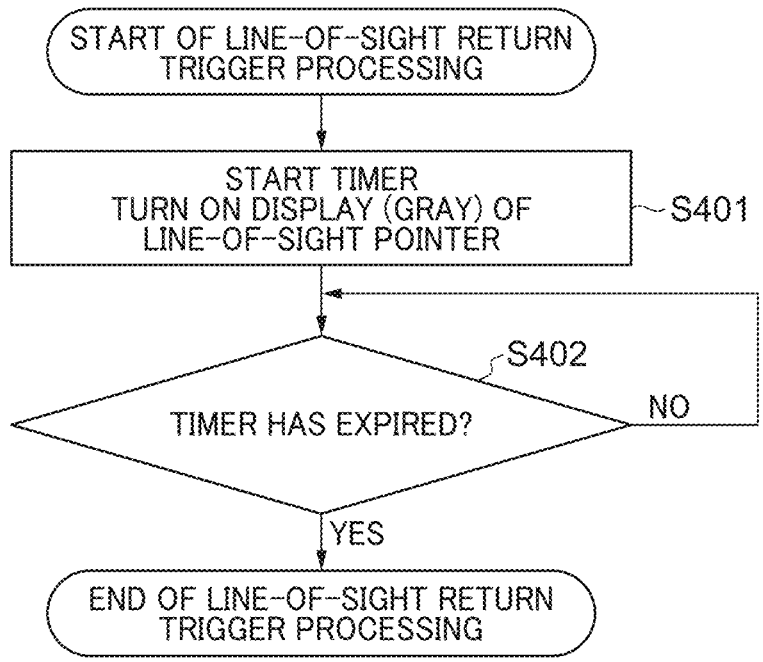
FIG. 4 is a flowchart that shows the flow of a line-of-sight return trigger processing performed by the image pickup apparatus according to the first embodiment.

Next, the line-of-sight return trigger processing performed by the image pickup apparatus according to the first embodiment (the line-of-sight return trigger processing performed by the system control unit 50 in S316) will be described. FIG. 4 is a flowchart that shows the flow of the line-of-sight return trigger processing performed in S316 of FIG. 3.

First, in S401, the system control unit 50 starts the timer, and at the same time causes the EVF 29 to display the line-of-sight pointer in a second predetermined color by turning on the display of the line-of-sight pointer on the EVF 29. The second predetermined color is a color different from the first predetermined color, for example, in the case that the first predetermined color is red, the second predetermined color may be gray, alternatively, the second predetermined color may be a color other than red and gray. In S401, starting the timer means setting the setting value of the system timer 53 to a predetermined time, and starting the measurement by the system timer 53. Moreover, the setting value of the system timer 53 (the predetermined time) may be a time that can be set by the user, or may be a predetermined fixed time. For example, the user may select the setting value of the system timer 53 (the predetermined time) from the menu screen displayed on the display unit 28 by pressing the menu button 81.

Next, in S402, the system control unit 50 judges whether or not the timer started in S401 has expired, and in the case of judging that the timer has expired, the system control unit 50 turns off the display of the line-of-sight pointer in the second predetermined color on the EVF 29, and ends the line-of-sight return trigger processing. After that, the system control unit 50 advances the processing to S317 of FIG. 3.

On the other hand, in S402, in the case of judging that the timer has not expired, the system control unit 50 repeats the process of S402 until the timer expires.

As described above, in the first embodiment, the line-of-sight return trigger condition in the line-of-sight return trigger processing is the expiration of the timer. Upon the expiration of the timer, it is possible to return to the subject selection function based on line-of-sight. By means of such a control, in the case that the setting value (the predetermined time) of the timer is shortened, it is possible to perform the subject selection based on line-of-sight without waiting for a long time after the zoom operation, and it is possible to quickly execute the specific function with respect to the desired subject. Further, in the case that the setting value (the predetermined time) of the timer is lengthened, since the execution of the specific function due to a user's unintended movement of the line-of-sight position is not performed, the user can confirm the live view image without feeling annoyed. Further, in the first embodiment, in S401, by displaying the line-of-sight pointer on the EVF 29 in the second predetermined color different from the first predetermined color, it is possible to intuitively inform the user that the specific function at the line-of-sight position has not yet been executed.

Hereinafter, a second embodiment of the present disclosure will be described.

Since the configuration of an image pickup apparatus according to the second embodiment of the present disclosure is the same as the configuration of the image pickup apparatus 100 according to the first embodiment shown in FIG. 1A, FIG. 1B, and FIG. 2, the description thereof will be omitted.

Further, except for the line-of-sight return trigger processing of S316 of FIG. 3, since the flow of the control processing performed by the image pickup apparatus according to the second embodiment is the same as the flow of the control processing performed by the image pickup apparatus 100 according to the first embodiment shown in FIG. 3, the description thereof will be omitted.

Figure 5:
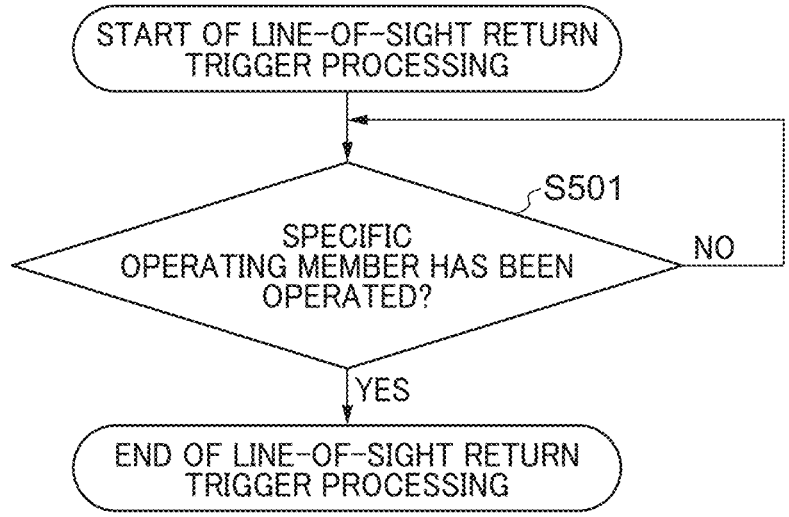
FIG. 5 is a flowchart that shows the flow of a line-of-sight return trigger processing performed by an image pickup apparatus according to a second embodiment of the present disclosure.

Hereinafter, a line-of-sight return trigger processing performed by the image pickup apparatus according to the second embodiment will be described. FIG. 5 is a flowchart that shows the flow of the line-of-sight return trigger processing of S316 of FIG. 3 performed by the image pickup apparatus according to the second embodiment.

First, in S501, the system control unit 50 judges whether or not a specific operating member of the operating unit 70 has been operated by the user, and in the case of judging that the specific operating member has been operated by the user, the system control unit 50 ends the line-of-sight return trigger processing. After that, the system control unit 50 advances the processing to S317 of FIG. 3.

On the other hand, in S501, in the case of judging that the specific operating member has not been operated by the user, the system control unit 50 repeats the process of S501 until the specific operating member is operated.

As described above, in the second embodiment, the line-of-sight return trigger condition in the line-of-sight return trigger processing is that the specific operating member has been operated (that is, the operation of the specific operating member by the user). When a clear declaration of the user's intention, which is the operation of the specific operating member by the user, is performed, it is possible to return to the subject selection function based on line-of-sight. As a result, the subject selection due to returning of the subject selection function based on the line-of-sight at a user's unintended timing is not performed, and it is possible to reduce that a shutter chance (the photographing opportunity) is missed. Moreover, the specific operating member may be a predetermined member or may be a user-determined member. For example, the user may select the specific operating member from the menu screen displayed on the display unit 28 by pressing the menu button 81.

Hereinafter, a third embodiment of the present disclosure will be described.

Since the configuration of an image pickup apparatus according to the third embodiment of the present disclosure is the same as the configuration of the image pickup apparatus 100 according to the first embodiment shown in FIG. 1A, FIG. 1B, and FIG. 2, the description thereof will be omitted.

Further, except for the line-of-sight return trigger processing of S316 of FIG. 3, since the flow of the control processing performed by the image pickup apparatus according to the third embodiment is the same as the flow of the control processing performed by the image pickup apparatus 100 according to the first embodiment shown in FIG. 3, the description thereof will be omitted.

Figure 6:
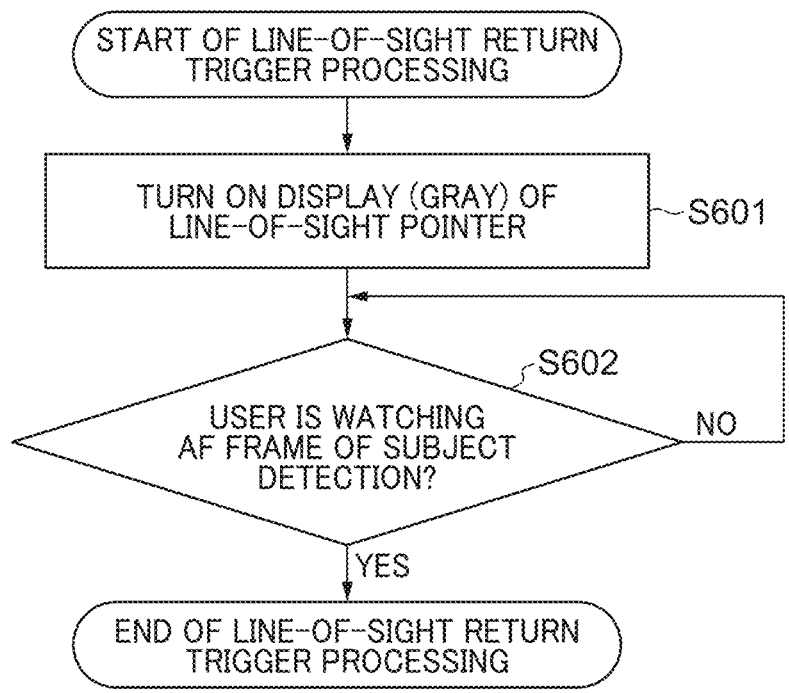
FIG. 6 is a flowchart that shows the flow of a line-of-sight return trigger processing performed by an image pickup apparatus according to a third embodiment of the present disclosure.

Hereinafter, a line-of-sight return trigger processing performed by the image pickup apparatus according to the third embodiment will be described. FIG. 6 is a flowchart that shows the flow of the line-of-sight return trigger processing of S316 of FIG. 3 performed by the image pickup apparatus according to the third embodiment.

First, in S601, the system control unit 50 causes the EVF 29 to display the line-of-sight pointer in the second predetermined color by turning on the display of the line-of-sight pointer on the EVF 29. The second predetermined color is a color different from the first predetermined color, for example, in the case that the first predetermined color is red, the second predetermined color may be gray, alternatively, the second predetermined color may be a color other than red and gray.

Next, in S602, the system control unit 50 judges whether or not the user is gazing at (watching) the AF frame for subject tracking in the subject detection (that is, the AF frame set by the subject detection unit). In S602, in the case of judging that the user is watching the AF frame, the system control unit 50 turns off the display of the line-of-sight pointer in the second predetermined color on the EVF 29, and ends the line-of-sight return trigger processing. After that, the system control unit 50 advances the processing to S317 of FIG. 3. Specifically, in S602, the system control unit 50 judges whether or not the user is watching the AF frame based on an amount that the line-of-sight pointer overlaps with the AF frame. That is, in the case that the amount that the line-of-sight pointer overlaps with the AF frame exceeds a predetermined amount, the system control unit 50 judges that the user is watching the AF frame. For example, the predetermined amount may be half of the line-of-sight pointer. In the case that the predetermined amount is half of the line-of-sight pointer, when more than half of the line-of-sight pointer overlaps with the AF frame, the system control unit 50 judges that the user is watching the AF frame. Moreover, the predetermined amount may be a predetermined fixed amount other than half of the line-of-sight pointer, or may be an amount that can be set by the user.

On the other hand, in S602, in the case of judging that the user is not watching the AF frame, the system control unit 50 repeats the process of S602 until the user becomes watching the AF frame.

As described above, in the third embodiment, the line-of-sight return trigger condition in the line-of-sight return trigger processing is that the user is watching the AF frame (that is, gazing at the AF frame). Upon gazing at the AF frame by the user, it is possible to return to the subject selection function based on line-of-sight. By means of such a control, it is possible to reduce the execution of the specific function at a user's unintended position, especially at a position where the subject is not detected, and it is possible to reduce that the shutter chance is missed due to the labor and time of selecting the subject again. Further, in the third embodiment, in S601, by displaying the line-of-sight pointer on the EVF 29 in the second predetermined color different from the first predetermined color, it is possible to intuitively inform the user that the specific function at the line-of-sight position has not yet been executed.

Although in each of the above-described example embodiments, an image pickup apparatus has been described as the electronic apparatus to which the present invention can be applied, the present invention is not limited to implementations involving the above-mentioned image pickup apparatus. For example, in other embodiments, the present invention can also be applied to an electronic apparatus capable of performing the line-of-sight input that has another image pickup means and the zoom operating member. For example, the present invention can also be applied to a mobile terminal, which has a camera function and is capable of performing the line-of-sight input, such as a smartphone or a tablet terminal, or to a digital video camera capable of performing the line-of-sight input. Further, the present invention can also be applied to a gaming device, which has a camera function and is capable of performing the line-of-sight input, a wearable device having an image pickup unit such as a head-mounted display device, and the like. Further, although in each of the above-described embodiments, the configuration of realizing the line-of-sight input function by the combination of the EVF 29 and the line-of-sight detecting unit 160 has been adopted, a configuration of realizing the line-of-sight input function by the combination of the line-of-sight detecting unit 160 and a display device other than the EVF 29 may be adopted in each of the above-described embodiments.

Although example embodiments of the present disclosure have been described above, the present invention is not limited to the above-described embodiments, and various modifications and changes can be made within the scope of the gist thereof.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-076425, filed Apr. 28, 2021, which is hereby incorporated by reference herein in its entirety.

What is claimed is:

1. An electronic apparatus comprising:
   an eye tracking device configured to detect whether or not a user is looking at an electronic view finder and, if so, to obtain information relating to a position of the user's line-of-sight, the eye tracking device including an image forming lens and a line-of-sight detection sensor;
   a zoom operating member configured to perform a zoom operation;
   one or more processors; and
   one or more memories storing instructions that, when executed by the one or more processors, cause the electronic apparatus to perform operation comprising:

selecting a subject from an image based on the position of the detected line-of-sight; and performing control so that when the zoom operation is started by the zoom operating member, subject selection based on the detected position of the line-of-sight is stopped without stopping line-of-sight detection performed by the electronic apparatus.

2. The electronic apparatus according to claim 1, wherein the operations further comprise:

detecting a subject from an image, and wherein the selecting selects a subject corresponding to a position of the line-of-sight detected by the eye tracking device among the subjects detected by the subject detecting performed by the electronic apparatus.

3. The electronic apparatus according to claim 1, further comprising:

an image pickup unit, and wherein the subject detecting detects a subject from an image picked up by the image pickup unit, and the selecting selects a subject from the image picked up by the image pickup unit.

4. The electronic apparatus according to claim 1, wherein the control is performed so that in a case that a specific function is executed with respect to the selected subject, when the zoom operation is started by the zoom operating member, the subject selection based on the line-of-sight's position is stopped without stopping the line-of-sight detection performed by the eye tracking device, and executing of the specific function is continuously performed with respect to a subject that is selected based on the line-of-sight's position before the zoom operation is started.

5. The electronic apparatus according to claim 4, wherein the control is performed so that in a case that the subject detected by the subject detecting performed at the line-of-sight position before the zoom operation is started exists and detecting of the subject by the subject detecting performed by the electronic apparatus is continued while the zoom operation is being performed, after the zoom operation is ended, when a predetermined condition is satisfied, the executing of the specific function is performed with respect to the subject selected based on the line-of-sight position.

6. The electronic apparatus according to claim 4, wherein the control is performed so that regardless of whether or not the subject detected by the subject detecting performed at the line-of-sight position before the zoom operation is started exists, while the zoom operation is being performed, the specific function based on the line-of-sight position is not performed.

7. The electronic apparatus according to claim 4, wherein the control is performed so that in a case that the subject detected by the subject detecting performed at the line-of-sight position before the zoom operation is started exists and the subject cannot be detected by the subject detecting performed while the zoom operation is being performed, upon the electronic apparatus becoming unable to detect the subject, the executing of the specific function is stopped.

8. The electronic apparatus according to claim 4, wherein the specific function is at least one of an auto focus function, an auto exposure function, an auto white balance function, and a subject tracking function.

9. The electronic apparatus according to claim 5, wherein the predetermined condition is that a predetermined time is clocked by a timer.

10. The electronic apparatus according to claim 9, wherein the control is performed so that after the zoom operation is ended, the timer is started, and at the same time a line-of-sight pointer indicating the line-of-sight position is displayed in a second predetermined color different from a first predetermined color, when the predetermined time has elapsed since the timer was started, the line-of-sight pointer is displayed in the first predetermined color after changing from the second predetermined color to the first predetermined color.

11. The electronic apparatus according to claim 5, wherein the predetermined condition is that a specific operating member has been operated.

12. The electronic apparatus according to claim 5, wherein the predetermined condition is that the user is gazing at an auto focus frame set by the subject detection unit.

13. The electronic apparatus according to claim 12, wherein the control is performed so that in a case an amount that a line-of-sight pointer indicating the line-of-sight position overlaps with the auto focus frame exceeds a predetermined amount, it is judged that the user is gazing at the auto focus frame.

14. The electronic apparatus according to claim 12, wherein the control is performed so that after the zoom operation is ended, a line-of-sight pointer indicating the line-of-sight position is displayed in a second predetermined color different from a first predetermined color, and when the user is gazing at the auto focus frame, the line-of-sight pointer is displayed in the first predetermined color after changing from the second predetermined color to the first predetermined color.

15. A control method for an electronic apparatus, comprising:

detecting a line-of-sight of a user;

performing acceptance of a zoom operation;

selecting a subject from an image based on an endpoint of the detected line-of-sight; and performing control so that when the zoom operation is started by the zoom operating member, subject selection based on the endpoint of the detected line-of-sight is stopped without stopping the line-of-sight detecting performed by the electronic apparatus.

16. A non-transitory computer-readable storage medium storing a program for causing an electronica apparatus to execute a process, the process comprising:

detecting a line-of-sight of a user;

performing acceptance of a zoom operation;

selecting a subject from an image based on an endpoint of the detected line-of-sight; and performing control so that when the zoom operation is started by the zoom operating member, subject selection based on the endpoint of the detected line-of-sight is stopped without stopping the line-of-sight detecting performed by the electronic apparatus.

* * * * *